Jan. 20, 1942.  E. E. KELLEY  2,270,310
MACHINE TOOL
Filed June 1, 1938  4 Sheets-Sheet 1
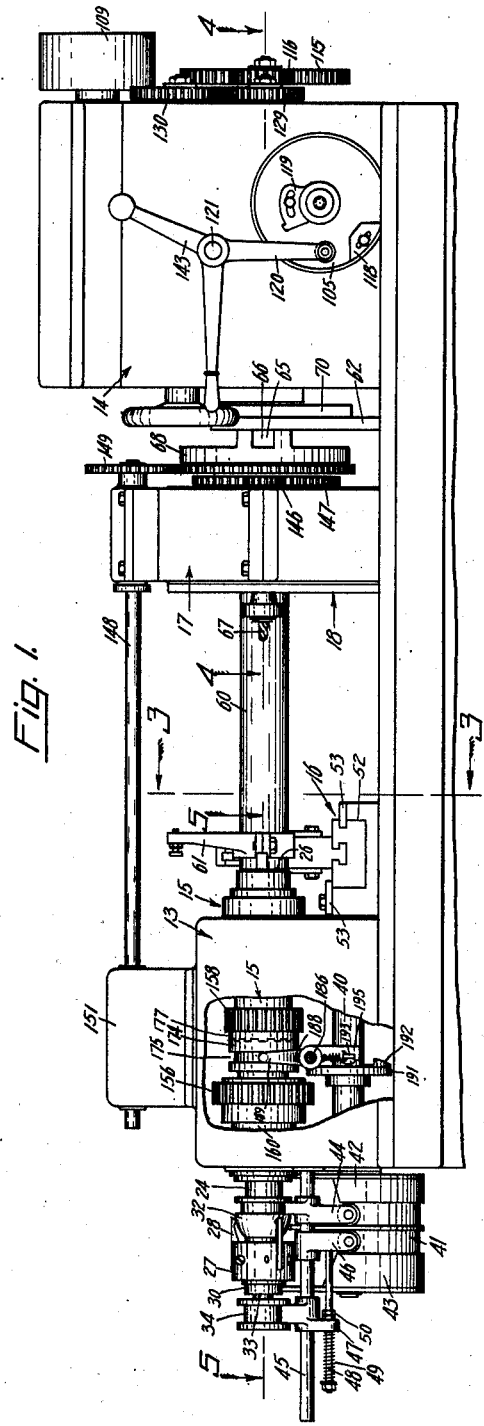
INVENTOR
Elmer E. Kelley
By
ATTORNEY Jan. 20, 1942.  E. E. KELLEY  2,270,310
MACHINE TOOL
Filed June 1, 1938  4 Sheets-Sheet 2

INVENTOR
Elmer E. Kelley
By
ATTORNEY

Jan. 20, 1942.   E. E. KELLEY   2,270,310
MACHINE TOOL
Filed June 1, 1938   4 Sheets-Sheet 3

INVENTOR
Elmer E. Kelley
By
ATTORNEY

Jan. 20, 1942.                    E. E. KELLEY                    2,270,310
                                 MACHINE TOOL
                              Filed June 1, 1938            4 Sheets-Sheet 4
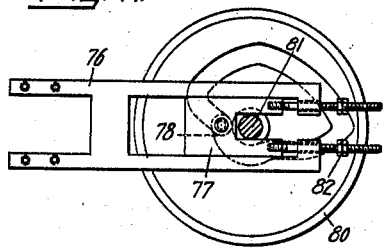
Fig. 11.
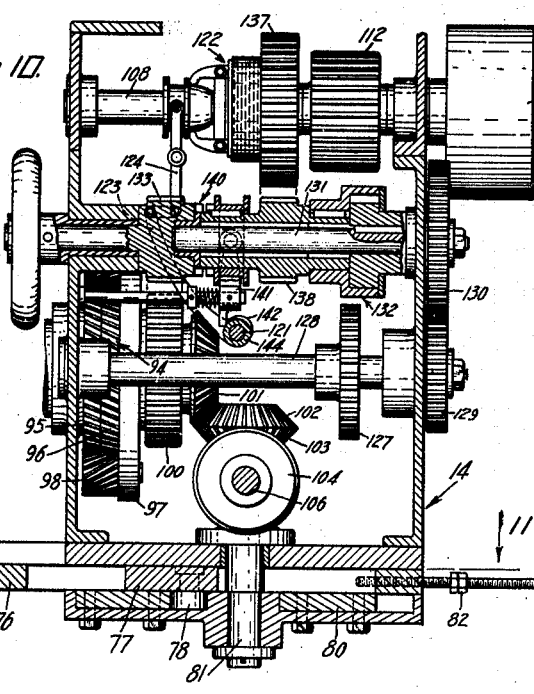
Fig. 10.
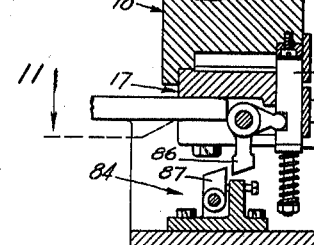
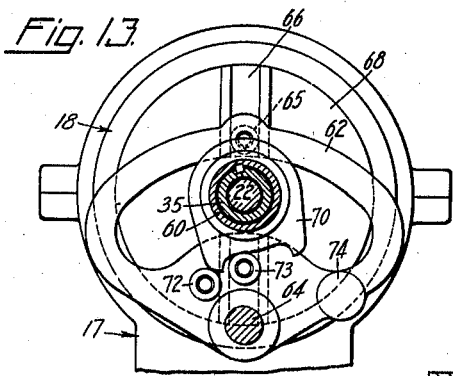
Fig. 13.
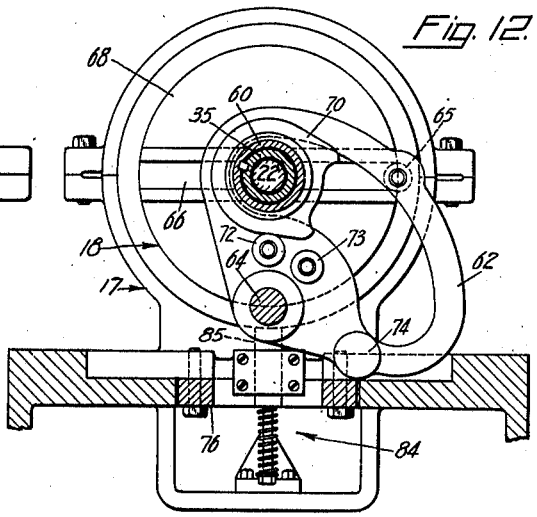
Fig. 12.
INVENTOR
Elmer E. Kelley
By
ATTORNEY Patented Jan. 20, 1942

2,270,310

UNITED STATES PATENT OFFICE 2,270,310

MACHINE TOOL

Elmer E. Kelley, Windsor, Vt.

Application June 1, 1938, Serial No. 211,229

37 Claims. (Cl. 29—53)

The present invention relates to improvements in machine tools and more particularly to machines known as automatic screw machines.

In the operation of machines of this character usually having two or more work rotating spindles, a series of operations are performed on the work of each spindle simultaneously. For example, in a screw machine having two spindles such as that which forms the embodiment of the present invention, the work in the respective spindles may be in different stages of progress, for instance, one spindle starting a first operation while the other spindle has completed the first operation and is starting the second operation. These operations may be of any one or groups of the following: drilling, threading, counter-boring, knurling, forming or cutting off, etc., the necessary operations to produce a certain article of manufacture being coordinated in such manner as to produce the article efficiently. This coordination usually requires that the respective spindles be accomplishing operations of a substantially different nature, the tools for which therefore have appreciably different cutting speeds. In setting up a machine to accommodate such operations, the operator usually chooses a speed for the spindles somewhere between the preferred operating speeds and usually as high as possible to assure rapid production. By operating the machine in this manner, the slow speed tool is operated at an excessive rate which reduces the life of the tool, and the higher speed tool is operated at a speed inadequate for the most efficient production.

The present invention has for its general object, the provision of an improved machine of the character indicated including means whereby the respective work rotating spindles may be driven at variable speeds, the speed of each spindle being suitable to attain maximum operating efficiency of the particular tool presented to the work.

A further object of the invention resides in the provision of an improved automatic screw machine having a pair of spindles, with a speed change mechanism for driving the spindles selectively at variable speeds, and control means for effecting the change in speed of each spindle in timed relation with the mechanism for automatically presenting the different tools to the work.

Another object is to provide an improved speed change mechanism for association with the work rotating spindles of the machine, the improved mechanism affording a simple compact and rugged organization, assuring satisfactory service over an extended period of time.

A still further object of the invention is to provide improvements in a machine of the type shown in my prior Patent No. 1,892,239, issued December 27, 1932.

Other objects and advantages will hereinafter appear.

With the above and other objects and features in view, the invention will now be described with reference to the accompanying drawings wherein one embodiment which my invention may assume in practice is shown for purposes of illustration.

In the drawings:

Figure 1 is a side elevational view of the machine embodying the invention, portions of the base being omitted;

Fig. 2 is a transverse sectional view through the headstock of the machine, taken on line 2—2 of Fig. 5;

Fig. 3 is a transverse sectional view taken on line 3—3 of Figure 1 and showing the transverse tool slide assembly;

Fig. 10 is a longitudinal sectional view through the gear box, taken on line 10—10 of Fig. 4, showing the gear box mechanism and turret slide actuating mechanism.

Fig. 11 is a fragmentary plan view taken on line 11—11 of Fig. 10 showing the turret slide actuating mechanism;

Fig. 12 is a transverse sectional view taken on line 12—12 of Fig. 4, showing the turret indexing mechanism in normal inactive condition, and Fig. 13 is a view similar to Fig. 12 but showing the turret indexing mechanism partly actuated.

Figures 4, 5:
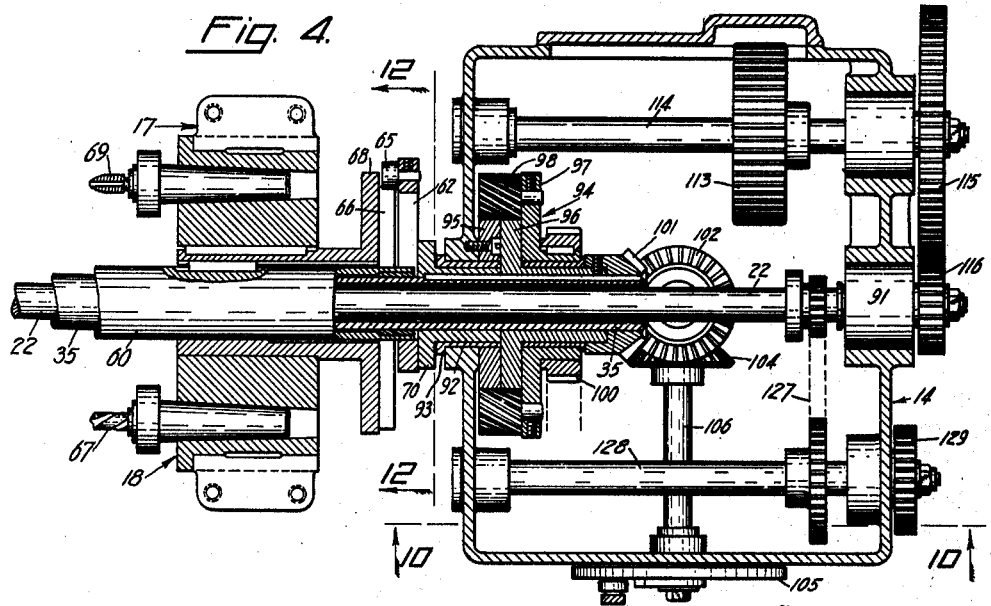
Fig. 4 is a sectional plan view taken on line 4—4 of Figure 1, and showing portions of the gear box mechanism and associated turret indexing mechanism.
Fig. 5 is a sectional plan view through the headstock taken on line 5—5 of Figure 1.

A description of the various units of mechanism of the machine shown and described in my prior patent, is hereinafter set forth in some detail, to present a clear understanding of the relation and cooperation of the several units, with my improvements therein, and to bring out the salient advantages obtained thereby.

The embodiment of my invention illustrated in the drawings comprises generally, a headstock 13, a gear box 14 for driving the various units of mechanism, the headstock having a plurality of work rotating spindles 15, the work stock in which are operated upon by tools carried in a transverse slide 16, or other tools supported in a turret slide 17, by an indexing tool turret 18 thereof; the present invention being directed more particularly to improved means for rotating the spindles 15 at variable speeds consistent with the work being done by the respective tools of the tool slide, and/or, the respective tools in the tool turret; the invention being further directed to provide improved means whereby the speed changes of the spindles 15 are effected in timed relation with the indexing of the turret carried tools, or the changing of the tools by the transverse tool slide.

Referring first to the general structure of the machine shown in the above patent, the headstock 13 is arranged at one end and the gear box 14 at the opposite end. A pair of spindles 15 are rotatably supported by the headstock, and the tool slide 16 is arranged to move transversely of the machine to feed tools transversely of work carried by the spindles. The turret slide 17 is slidable longitudinally of the machine and carries the tool turret 18 which is indexed for bringing a tool or tools into position so that they may engage and disengage the work carried by the spindles as the slide 17 moves forward and back. The spindles 15 are hollow and are rotatable in bearings 20 of the headstock 13. A central shaft 22 journalled at one end by a bearing 23 in the headstock 13, extends longitudinally and is journalled at its outer end in the gear box 14. It is driven continuously as will later appear and functions to rotate the spindles at selective speeds in a manner hereinafter described.

The spindle assembles are similar in construction so that but one will be described in detail. Each spindle 15 includes an outer tube 24 and a collet tube 25 which, as usual is provided with a split forward end forming a collet 26 and which is freely slidable in the outer tube. A collar 27 adjacent the rear end of the spindle is provided with levers 28 pivoted thereto. The collar 27 is carried by a tubular member 30 secured to the outer end of the collet tube 25 and its rear side is arranged to abut member 30. The inner ends of the levers 28 are arranged to bear on the end of the spindle tube 24 while the outer ends of levers 28 are arranged to be acted upon by the curved surface of a cam or cone 32 which is slidable on the spindle. As the cone 32 moves rearwardly, the levers are swung outwardly and their inner ends abut the end of tube 24 so that the collet tube 25 is moved rearwardly whereby its collet is contracted so as to firmly grip a bar of work therein.

A feed tube 33 is slidable in the collet tube 25 and has a split forward end which is resilient for yieldingly embracing the work. A collar 34 is fixed to the rear end of the tube and is engageable by means to be described for moving the feed tube back and forth. While the collet 26 clamps the work, the feed tube 33 may be moved to the rear. When the collet 26 releases the work the feed tube 33, yieldingly gripping the work, will feed the work forwardly.

A tube 35 is journalled at its end in a bearing 36 of the headstock 13 and surrounds shaft 22, being out of contact therewith, and has a gear 37 fixed thereto which meshes with a gear 38 of a shaft 40 journalled in the walls of the headstock 13. This shaft 40 has a cam drum 41 on its outer end provided with cam pads 42, 43. A follower 44 is slidable on a guide rod 45, has a projection running into a groove of cone 32 and is engageable by cam pad 42. Another follower 46 slidable on the guide rod 45 is engageable by cam pad 43. A member 47 engaging collar 34 is also slidable on the guide rod 45 and a threaded rod 48 extends from the follower 46 and through member 47. A spring 49 between the outer end of rod 48 and member 47 functions so that collar 34 will be yieldingly urged to the right, and nuts 50 on the rod abut member 47 for opposite actuation. As the cam drum 41 rotates, it will move followers 44 and 46 so that in proper timed relation, the collet will release or grip the work, while the feed tube moves forward and back to feed the work forwardly of the collet. The tube 35 at its end remote from the headstock is rotatable in the gear box 14 and is driven by suitable means therein so that the collets 26, and the feed tubes 33 of the spindles are operated in harmony for rotating work, and for feeding the work at the proper time.

The tool slide 16 just forwardly of the headstock is slidable transversely in ways 52 and is held for sliding movements therein by gibs 53. Studs at the side of the slide have rolls 54 rotatable thereon which are engaged by a cam 55 fixed to the inner end of shaft 40. As the shaft rotates, first one and then the other of the rolls are engaged by the cam so that the slide 16 is reciprocated transversely. Supports for tools 57, 58 and 59 are adjustable in the tool slide 16. These tools may take any form desired depending upon the work to be done on the bars carried by the spindles. Preferably, however, the tools will be arranged so that a certain operation is being performed on the bar of one spindle while another operation is being performed on the bar of the other. As the tool slide moves in one direction, the tool 59 at one side of the slide may be arranged to cut off from the bar of one spindle a previously formed piece of work, while some tool at the other end of the tool slide is performing a forming operation on the end of the bar of the other spindle.

An indexing tube 60 surrounds tube 35 and is preferably out of contact therewith except where it is journalled for rotation thereon at opposite ends adjacent the gear box and headstock. This tube 60 is rotated intermittently by the indexing mechanism shown in Figs. 4 and 12, for indexing a stock stop arm 61 fixed thereto adjacent the headstock so that the arm may be positioned in front of one spindle and then the other and against which the inner end of a bar of work or stock may abut when fed forwardly by a feed tube in a spindle.

The tool turret 18 is also indexed automatically by the mechanism shown in Figure 12, and in timed relation to the other mechanisms of the machine, as will be hereinafter apparent. The indexing mechanism comprises briefly, a rocking indexing arm 62 pivoted at 64 and has a roller 65 riding in a radial slot 66 of a disk 68 whereby, as the indexing arm 62 is rocked to the left from the Figure 12 position, turret 18 is rotated one half a turn so that the respective tools 67, 69 carried thereon, are caused to change places with each other, each being thus aligned with the opposite work spindle. The indexing arm 62 is rocked by cooperation of a cam 70 carried on the tube 35 with rolls 72, 73, which cam is rotated clockwise from the Figure 12 position to Figure 13 position in which turret 18 is momentarily stopped due to the dwell portion of cam 70 and is thereafter further rotated to complete the half turn; all as described in detail in said patent.

The stock stop arm 61, Figures 1 and 3, carried on the indexing tube 60, is normally in an upright position either above the tube or below same, being rotated to either of said positions by the indexing mechanism, Figure 12. However, when the said mechanism is in the position shown in Figure 13, the dwell period thence occurring, positions the stock stop arm 61 adjacent one of the work spindles momentarily so as to limit axial movement of the work rod as same is automatically fed.

After each indexing movement, the turret slide 17 is moved forwardly towards the spindle and carries with it the disk 68. The disk is thus disengaged from the roll 65 on the indexing arm 62, which disengagement permits the indexing arm to be restored to the position shown in Figure 12, as by means of a counter-weight 74 carried on the arm. Thus, when the turret slide 17 is retracted to its rearmost position, the roll 65 again registers with and engages the opposite portion of slot 66 in disk 68 preparatory to another indexing movement.

The turret slide 17 is reciprocated to and from the work spindles by the mechanism shown most clearly in Figure 11. The turret slide has a slide frame 76 secured thereto which has a block 77 mounted thereon for limited endwise relative to the slide 76. The block carries a cam follower or roller 78 disposed in a slot of cam disk 80, the latter being secured to a shaft 81 below the gear box 14 and rotated by the gearing therein. This mechanism serves to reciprocate the turret slide 17 in a manner so as to cause same to dwell at each extremity of reciprocatory movement, the extent of the dwelling period being variable by adjustment of the stops 82 associated with the said block and slide frame.

During the time the turret slide 17 is being reciprocated, the turret 18 is locked thereto by the locking mechanism 84 shown in Figure 10, this mechanism operating to release the turret 18 from the turret slide, as the latter assumes its rearward position, the locking mechanism 84 including a spring pressed bolt 85 slidable in the turret slide 17 and engaging recesses in the turret 18, the bolt 85 being momentarily retracted by cooperation of a lever 86 engaging a trip dog 87; as set forth in detail in said patent.

A general description of the driving mechanism in the gear box 14 will suffice for a clear understanding of the operation of the machine, it being preferred to employ a drive mechanism substantially as shown and described in my prior patent, portions of which are shown in Figures 4 and 10. The drive mechanism of the gear box 14 actuates the various units of the machine heretofore described, preferably from a single rotary drive element or shaft, and including automatic control means and several coordinated drive mechanisms by which the respective units of the machine are operated in harmony one with the other.

It will be seen from the foregoing, that the shaft 22 constitutes the main drive for the work spindles 15 through change speed gearing hereinafter described. The tube 35 forms the main drive for a collet actuating mechanism and the stock feeding device of the spindles, through the gears 37, 38, shaft 40 and cam drum 41, and also serves to drive the transversely slidable tool slide 16 by cam 55. Tube 35 also actuates the turret indexing mechanism by driving the cam 70 thereof.

The shaft 22 extends through the gear box 14, being journalled in bearing 91 therein. The tube 35 is keyed to the indexing cam 70, the hub 92 of the cam being rotatable in a bushing 93 in the gear box. Tube 35 is driven through planetary gearing 94 which may include a gear 95 having a certain number of teeth and fixed to the gear box 14, and a gear 96 having a different number of teeth than gear 95 and keyed to the tube 35. A spider 97 is rotatable on the hub of gear 96 and has pinions 98 rotatable thereon and in mesh with gears 95, 96. A sprocket 100 is fixed to the spider 97 for driving the planetary gearing 94. A bevel gear 101 rotatable with gear 96 is in mesh with a bevel gear 102 carried on the shaft 81 and drives the turret slide reciprocating cam 80. A bevel gear 103 in mesh with a gear 104, see Fig. 4, drives a cam disk 105 through a shaft 106, the cam serving to control a main drive clutch as hereinafter described.

With reference particularly to Fig. 10, the aforementioned single drive element of the gear box mechanism may be a shaft 108 on which a pulley 109 is fixed for driving said shaft from a suitable power source. The drive for the central shaft 22 may include a sprocket 112 on the main drive shaft 108 connected by chain to sprocket 113 on a jack shaft 114, the latter driving the central shaft 22, through a gear train 115, 116.

The drive for the tube 35 may be effected through either a high speed or a low speed train, the desired speed train being selected automatically by the cam 105, see Figure 1, on which cam pads 118, 119, are carried and cooperate to oscillate an arm 120 on a rock shaft 121, to connect or disconnect a clutch 122 by shifting same by a shifter arm 123 and associated lever 124, the arm 123 being fixed to the shaft 121.

The low speed train for driving tube 35 may include a chain and sprocket drive 127, driven from the central shaft 22 and operating through a jack shaft 128 which drives a gear train 129, 130, Figure 10, gear 130 being arranged to drive a shaft 131 through an overrunning clutch 132, the shaft 131 being normally operatively connected to actuate a sprocket 133, connected by chain to the sprocket 100 which, as aforestated, is fixed to the spider 97 of the planetary gearing 94, see Figure 10.

The high speed train may include a driving sprocket 137 rotatable on shaft 108 and connectible for rotation therewith by operation of clutch 122. Sprocket 137 drives a sprocket 138, the hub of which is keyed to the outer member of the overrunning clutch 132 at one side thereof, and is adapted to drive the sprocket 133 at the other side.

When clutch 122 is engaged, the drive of tube 35 will be at high speed directly through the sprockets 137, 138, and 133, 100, the overrunning clutch 132 permitting sprocket 138 to overrun or rotate faster than the slow speed train. When clutch 122 is disengaged, by the action of cam 105, the high speed train is thus disconnected and the low speed train will, therefore, drive tube 35, by sprockets 112, 113, through the gears 115, 116, through the sprocket drive 127 and thence through the gearing 129, 130, to drive the overrunning clutch 132, and thereby the sprockets 133, 100.

A manually operable clutch 140 serves to connect or disconnect the hub of sprocket 138 with sprocket 133 at will, through the medium of a shifter 141 and cam 142, the latter being operable by a hand lever 143 and connected thereto by a sleeve 144 rotatably carried on shaft 121.

As shown in Figure 1, as a modification of the tool turret arrangement shown in Figure 4, the machine may be arranged so as to rotate the tools carried by the turret 18 by providing tool holders which are journalled in the turret, one or more of the tool holders having a pinion gear 146 fixed thereto and in mesh with a common driving gear 147 rotatably mounted. Gear 147 may be driven by a counter-shaft 148 through a gear train 149, the counter-shaft 148 being preferably actuated by suitable gearing in a casing 151, from the main drive of the machine. The counter-shaft 148 may be slidably splined to its driving element in the casing 151 so as to accommodate axial movement of the counter-shaft during the reciprocatory movement of the turret slide 17.

The entire machine set forth in the preceding description is substantially similar to that shown and described in my prior patent, a general description of same having been given to bring out the cooperation of the improvements hereinafter set forth, therewith, and the salient advantages obtained thereby.

The improvements herein are directed to provide a variable speed drive for the work rotating spindles so that the speed of each spindle is that best suited for the particular tool operating on the work. In machines of this general character, the tools operating on a certain spindle are automatically changed to accomplish various operations and the improvements herein are, therefore, further directed to providing an automatic speed change control operative in conjunction with the means by which the tool change is effective, to synchronize or otherwise coordinate the selection of the spindle speed with the change of the tool.

The speed change mechanism embodying the improvements herein are shown more clearly in Figures 2 and 5 to 9, inclusive. The aforesaid central shaft 22, extending through the headstock 13, has fixed thereto a low speed driving gear 155 in mesh with a low speed driven gear 156 on each of the spindles 15. Central shaft 22 also has a high speed driving gear 157 affixed thereto and in mesh with a high speed driven gear 158 on each of the spindles.

Figure 7:
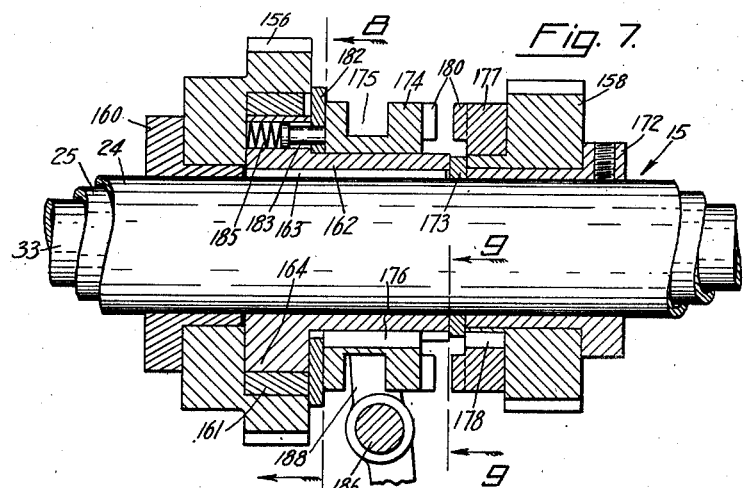
Fig. 7 is a detailed sectional view, showing the speed change mechanism of one of the spindles shown in Fig. 5, the clutch being shown disengaged to facilitate illustration.
Figure 8:
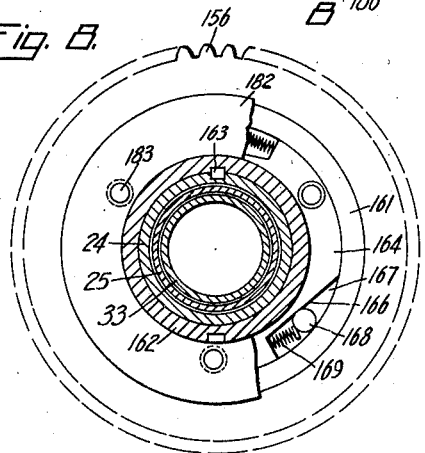
Fig. 8 is a transverse section taken on line 8—8 of Fig. 7.
Figure 9:
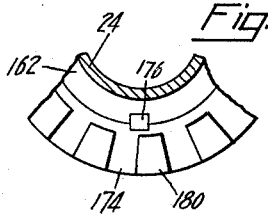
Fig. 9 is a fragmentary sectional view taken on line 9—9 of Fig. 7.

The arrangement of the driven gears 156, 158 and associated elements on the spindles 15 is identical for each of the spindles and is illustrated in detail in Figures 7 and 8. The outer tube 24 of the spindle is shown and has secured thereon a bushing 160 on which the low speed gear 156 is rotatably mounted. Gear 156 is formed to provide a concentric recess in which a clutch ring 161 is secured. A clutch body 162 is fixed to the outer tube 24, as by a key 163, and includes a radial flange portion 164 disposed in the recess of gear 156, interially of the ring 161. As shown more clearly in Fig. 8, the flange 164 has in its periphery, a series of notches, each notch having a tangential wall 166 forming a tapered socket 167, in conjunction with the interior surface of ring 161. Within each socket 167 is disposed a clutch roll 168 backed by a spring 169 and adapted to clutch the body 162 and gear 156 to drive tube 24 as gear 156 is rotated in a counter-clockwise direction as viewed in Figure 8, the rolls 168 being urged toward the tapering end of the sockets 167 by the springs 169.

A bushing 172 mounts the high speed gear 158 rotatably on the spindle tube 24, a washer 173 abutting an end of the gear 158. A clutch collar 174 having an annular groove 175 is shiftable axially on the clutch body 162, being mounted for rotation therewith, as by a sliding key connection 176. A complemental clutch member 177 is fixed to the high speed gear 158 by a key 178, the clutch collar 174 and the clutch member 177 each having a series of teeth 180 engageable with each other by shifting the clutch collar, to thus provide a positive drive connection between the high speed gear 158 and the spindle tube 24.

It is desired that the clutch collar 174 be yieldably held normally in clutched position with member 177 so that the spindle tube 24 is normally driven through the high speed gear 158. For this purpose a thrust plate 182 is disposed between the clutch collar 174 and the flange portion 164 of the clutch body, in which plate, one or more pins 183 are slidably carried so as to abut clutch collar 174 at one end, the other end being disposed in an aperture of the clutch body 162 and backed by springs 185 therein.

Figure 6:
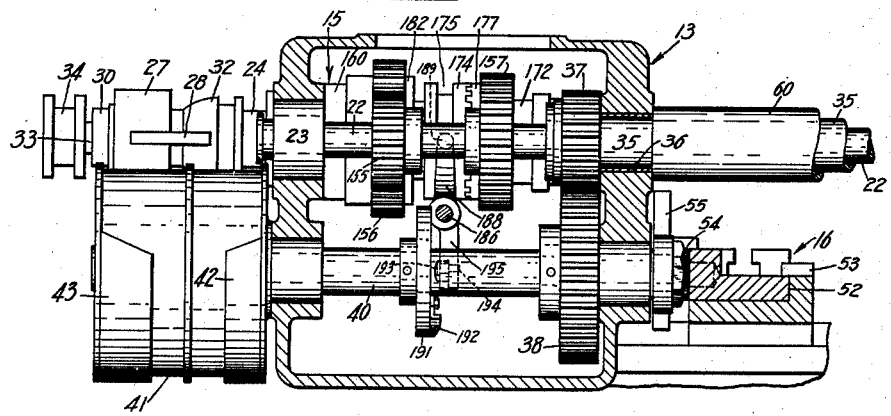
Fig. 6 is a longitudinal sectional view taken on line 6—6 of Fig. 5, the parts being shown in elevation.

The automatic means by which the clutch mechanism of each spindle 15 is controlled to effect a selection of the desired speed in accordance with the operation being performed on the work and in timed relation to the means by which the tools are changed, will now be described with reference particularly to Figs. 2 and 6. A shaft 186 is mounted transversely of the headstock 13, beneath the spindles 15 and carries clutch yokes 188, mounted for independent rocking movement, each yoke having fingers 189 riding in the annular grooves 175 of the respective clutch collars 174.

The aforementioned shaft 40 which carries cam drum 41 and cam 55, also has fixedly mounted thereon, a cam carrier wheel 191 having a cam 192 adjustably secured thereto as by means of a T-bolt engaging in an annular T-slot 190 of the wheel. This cam is arranged to engage members 193 each pivotally mounted at 194 on depending arms 195 of the respective clutch yokes 188, the members 193 being yieldably held in engageable position by appropriate springs 196 whereby, in the event that the cam wheel 191 be reversely rotated, the members 193 may swing out of the path of cam 192 when engaged thereby, and after being freed by the cam, members 193 will be restored to normal position by their springs 196.

As aforeindicated, the shiftable clutches of the spindles 15 are normally engaged so that the spindles are driven through gears 157, 158 at high speed, such as may be required for a drilling or cutting off operation on the work, as by the tool 67 on the turret 18 and the tool 59 on the tool slide 16.

The cam 192 being revolved by shaft 40, approaches and engages one of the members 193 and thereby swings clutch collar 174 to disengaged position. The high speed gear 158 is thus disengaged from the tube 24 so that the drive of the spindle is now effected by the low speed gear 156, through the overrunning clutch associated therewith. The dwell or flat portion of cam 192 may be of such length as to maintain the low speed drive for an adequate period of time to accomplish the complete operation by the slow speed tool which may be either, for example, a forming tool 57, on the tool slide 16, or a threading tool 69 on tool turret 18.

It is apparent from the foregoing, in view of the fact that shaft 40 actuates cam 192, that cam 192 is rotated in timed relation with the reciprocatory movement of the tool slide 16, in that the shaft 40 also carries the cam 55 which actuates the tool slide. It is also apparent, in view of the relation of tube 35, which actuates the indexing cam 70, with the cam 192, through the train of gears 37, 38, that the automatic selection of the spindle speed is effected in timed relation with the indexing of the tools on the turret 18. Since the indexing mechanism determines which of the tools 67, 69 are operable on a particular work spindle, and since the automatic speed selecting mechanism is operated by means having a definite or fixed relation to the indexing mechanism, it will be noted that the change of speed of the respective spindles 15 is effected in coordination with the change of the tools 67, 69 to each spindle. The same effect is had in reference to the respective tools carried on the tool slide 16 in that the change of these tools relatively to a work spindle is controlled by the reciprocation of the tool slide; from which it will be seen that the speed change mechanism automatically selects a speed for the respective spindles in coordination with the change of the respective tools by the tool slide 16. This assures that each spindle be rotated at a speed best suited to the tool being presented to the work and thereby assures a longer life for the tools, and increases the general efficiency of the machine in that the respective tools may be driven at the maximum speeds desired without sacrificing either the tool or the quality of the work produced.

The present application is a continuation in part of my co-pending application, Serial No. 85,130, filed June 13, 1936.

While I have in this application specifically described one embodiment which my invention may assume in practice, it will be understood that the same is shown for the purpose of illustration, and that my invention may be modified, and embodied in various other forms without departing from its spirit or the scope of the appended claims.

What I claim as new and desire to secure by Letters Patent is:

1. In a machine of the character described, in combination, a plurality of work spindles rotatable on fixed axes, a plurality of tools of different character, drive means operable to effect rotation of the work spindles at a plurality of speeds, tool feeding means controlling the positions of the tools relative to the spindles whereby the tools operate successively on the work in each of the respective spindles, and automatic means for selecting said speeds having an operative connection with said tool feeding means.

2. In a machine of the character described, a pair of work spindles rotatable on fixed axes, a pair of tools of different character operable on the work of said spindles, driving means operable to effect rotation of the work spindles at either high or low speed, tool feeding means controlling the positions of the tools relative to the spindles whereby the tools operate alternately on the work in each of the respective spindles, and automatic means for alternately connecting the low and high speed driving means having an operative connection with said tool feeding means, said means having an operative connection with said tool indexing means.

3. In a machine of the character described, in combination, a plurality of rotatable work spindles each rotatable about a fixed axis, means for driving said spindles at high or low speed, a plurality of tools of different character, tool feeding means supporting and controlling said tools to operate successively on the work in each of the respective spindles, and automatic means operatively connected with the control means for said tools for selecting said high or low speed in accordance with the character of the tool fed.

4. In a machine of the character described, in combination, a pair of rotatable work spindles each rotatable about a fixed axis, means for driving said spindles at either high or low speed, a pair of tools of different character, tool indexing means supporting said tools and rotatable to position the latter to operate on the work of said spindles, and automatic means for changing the positions of said tools to operate alternately on the work of each of the respective spindles and simultaneously selecting a high speed or a low speed drive for said spindles.

5. In a machine of the character described having a plurality of non-indexing work spindles rotatably carried thereon, an indexing tool turret adapted to hold a plurality of tools of different cutting speeds, means for indexing said tool turret, a multiple speed driving means for said spindles, including a plurality of actuating trains of different ratios, each actuating train being adapted to impart a forward rotation to each spindle at a speed corresponding to the cutting speed of the respective tools, and automatic means for connecting a different actuating train to each of said spindles operatively connected with and actuated in timed relation with said indexing means.

6. In a machine of the character described having a pair of non-indexing work spindles rotatably carried thereon, an indexing tool turret adapted to hold two tools of different cutting speeds, means for indexing said tool turret to present said tools alternately to the work in different spindles, means for driving said spindles including a low speed train and a high speed train, each actuating train being adapted to impart a forward rotation to each spindle at a speed corresponding to the cutting speed of the respective tools, and automatic means for selectively connecting said trains with said spindles, said speed selecting means being operatively connected with and actuated in timed relation with said tool turret indexing means.

7. In a machine of the character described having a plurality of non-indexing work spindles rotatably carried thereon, a reciprocatory indexing tool turret adapted to hold a plurality of tools of different cutting speeds, means for indexing said tool turret to present each tool to the respective spindles, a multispeed driving means for said spindles including a low speed train and a high speed train, each actuating train being adapted to impart a forward rotation to each spindle at a speed corresponding to the cutting speed of the respective tools, and means having an operative connection with said turret indexing means for selectively connecting said trains with said spindles in timed relation with said turret indexing means.

8. In a machine of the character described having a pair of non-indexing work spindles rotatably carried thereon, a reciprocatory indexing tool carrier adapted to hold two tools of different cutting speeds, a two speed driving means for said spindles including a low speed train and a high speed train each adapted to impart a forward rotation to each spindle at a speed corresponding to the cutting speed of the respective tools, and common driving means having connections thereto for automatically indexing said tool carrier to alternately present the tools to each of the respective work spindles and also having connections for alternately connecting either of said trains with the respective spindles.

9. In a machine of the character described, in combination, a pair of rotatable work spindles each rotatable about a fixed axis, means for driving said spindles at either high or low speed, pairs of tools of different character, a carrier for said tools slidable transversely of said spindles to present the respective tools of said pairs alternately to the work of each of the respective spindles, means for reciprocating said tool carrier, and automatic means operatively connected with said tool carrier reciprocating means for alternately connecting the high and low speeds of said driving means in timed relation with said tool carrier reciprocating means.

10. In a machine of the character described, in combination, a pair of rotatable work spindles each rotatable about a fixed axis, means for driving said spindles at either high or low speed, a plurality of tools of different operating speeds, a rotatable tool turret supporting said tools, means for indexing said turret to present each of said tools for operation with the work of the respective spindles including a rotatable driving member coaxial with said spindle driving means, and automatic means operatively connected with said rotatable driving member for selectively connecting the high and low speed of said driving means in timed relation with said turret indexing means.

11. In a machine of the character described, in combination, a pair of rotatable work spindles, means for driving said spindles at either high or low speed, pairs of tools of different character, a carrier for said tools slidable transversely of said spindles to present the respective tools of said pairs alternately to the work of the respective spindles, means for reciprocating said tool carrier, a second pair of tools of different operating speeds, a rotatable tool turret supporting said second pair of tools, means for indexing said turret to alternately present each tool of said turret for operation with the work of each of the respective spindles, means for alternately connecting the high and low speed driving means, and a common means for actuating said carrier reciprocating means, said turret indexing means and said connecting means in harmony.

12. In a machine of the character described, in combination, a pair of rotatable work spindles, means for driving said spindles at either high or low speed, a pair of tools of different character, a carrier for said tools slidable transversely of said spindles to present the respective tools of said pairs alternately to the work of each of the respective spindles, means for reciprocating said tool carrier, and automatic means for alternately connecting the high and low speed driving means including a rotatable control shaft and a cam on said shaft for actuating said drive connecting means, said tool carrier reciprocating means including a second cam on said control shaft.

13. In a machine of the character described, in combination, a pair of rotatable work spindles, means for driving said spindles at either high or low speed, a pair of tools of different operating speeds, a rotatable tool turret supporting said tools, means for indexing said turret to alternately present each of said tools for operation with the work of the respective spindles, automatic means for alternately connecting the high and low speeds of said spindle driving means including a rotatable control shaft and a cam on said shaft, and driving connections between said indexing means and said control shaft.

14. A machine of the class described comprising in combination, a pair of rotatable work spindles, a drive shaft, a low speed and a high speed drive gear on said drive shaft, a set of driven gears normally rotatable on each spindle including a low speed and a high speed gear in mesh with the respective drive gears, a clutch on each of said spindles for selectively and operatively connecting either of said driven gears with its spindle, shifters for actuating said clutches, a control shaft, an actuating member on said control shaft for operating said shifters, driving connections between said drive shaft and said control shaft, a tool carrier slidable transversely of said spindles to present tools of different character carried thereon alternately to the work of the respective spindles, and means actuated from said control shaft for operating said tool carrier.

15. A machine of the class described comprising in combination, a pair of rotatable work spindles, a drive shaft, a low speed and a high speed drive gear on said drive shaft, a set of driven gears normally rotatable on each spindle, including a low speed and a high speed gear in mesh with the respective drive gears, clutch means on each of said spindles for selectively and operatively connecting either of said driven gears with its spindles, shifters for actuating each of said clutch means, a control shaft, an actuating member on said control shaft for alternately operating said shifters, a rotatable tool turret adapted to support a pair of tools, means for indexing said turret to alternately present each of the tools for operation with the work of the respective spindles, said indexing means including a rotatable tube, and driving connections between said indexing tube and said control shaft for concomitantly operating each of said clutch means and indexing said turret.

16. A machine of the class described comprising in combination, a pair of rotatable work spindles, a drive shaft, a low speed and a high speed drive gear on said shaft, a set of driven gears normally rotatable on each spindle, including a low speed and a high speed gear in mesh with the respective drive gears, an overrunning clutch interposed between each low speed gear and each spindle, a positive clutch interposed between each high speed gear and each spindle shiftable to disable the high speed drive to thereby effect low speed driving of the spindle through said overrunning clutch, means for alternately shifting said positive clutches including a control shaft, a rotatable tool turret adapted to support a pair of tools, means for indexing said turret to alternately present each of the tools for operation with the work of the respective spindles, said indexing means including a rotatable tube, and driving connections between said indexing tube and said control shaft for concomitantly shifting said positive clutches and indexing said turret.

17. A machine of the class described comprising in combination, a pair of rotatable work spindles, a drive shaft, a low speed and a high speed drive gear on said drive shaft, a set of driven gears normally rotatable on each spindle, including a low speed and a high speed gear in mesh with the respective drive gears, an overrunning clutch interposed between each low speed gear and each spindle, a positive clutch interposed between each high speed gear and each spindle shiftable to disable the high speed drive to thereby effect low speed driving of the spindle through said overrunning clutch, resilient means for yieldably retaining said positive clutches in driving condition, means for alternately shifting said positive clutches in one direction against pressure of said resilient means, said shifting means including a control shaft, a rotatable tool turret adapted to support a pair of tools, means for indexing said turret to alternately present each of the tools for operation with the work of the respective spindles, said indexing means including a rotatable tube, and driving connections between said indexing tube and said control shaft for concomitantly shifting said positive clutches and indexing said turret.

18. A machine of the class described comprising, a support, a pair of spindles journalled therein for independent rotation, a single drive shaft, a low speed and a high speed drive gear on said drive shaft, a pair of driven gears on each spindle including a low speed and a high speed gear which are in mesh with the first-named gears and normally rotatable relative to the spindles with which they are associated, and means for selectively and operatively connecting either the high or low speed driven gears with its respective spindle.

19. A machine of the class described comprising, a support, a pair of spindles journalled therein for independent rotation, a single drive shaft, a low speed and a high speed drive gear on said drive shaft, a pair of driven gears on each spindle including a low speed and a high speed gear which are in mesh with the first-named gears and normally rotatable relative to the spindles with which they are associated, and means for selectively and operatively connecting either the high or slow speed driven gear with its respective spindle, the said means including a roll clutch associated with each slow speed driven gear and its spindle arranged for driving the spindle from the said gear, a shiftable member on each spindle, and engageable connections between the same and each high speed gear which when in engagement causes the spindle to be driven from said gear rendering the roll clutch inoperative for driving said spindle, the said shiftable members being independently shiftable.

20. A machine of the class described comprising, a support, a pair of spindles journalled therein for independent rotation, a single drive shaft, a low speed and a high speed drive gear on said drive shaft, a set of driven gears for each spindle each including a low speed and a high speed gear which are in mesh with the first-named driven gears and normally rotatable relative to the spindles with which they are associated, and means for selectively and operatively connecting either one of said driven gears to its respective spindle, said means including a roll clutch associated with each low speed driven gear and its spindle arranged for driving the spindle from said gear, a shiftable member on each spindle and driving connections between the same and the high speed gears which when in engagement cause the spindles to be driven from said high speed gear rendering the roll clutch inoperative, a cam shaft, driving connections between said drive shaft and cam shaft, and means operable by said cam shaft for actuating said shiftable members.

21. A machine of the class described comprising, a support, a pair of spindles journalled therein for independent rotation, a single drive shaft, a low speed and a high speed drive gear on said drive shaft, a set of driven gears on each spindle, each set including a low speed and a high speed gear in mesh with the first-named gears and normally rotatable relative to the spindles with which they are associated, and means for selectively and operatively connecting either one of said driven gears to its respective spindle including clutch members fixed on said spindles, driving means associated with said clutch members and low speed gears whereby the spindles are driven in one direction at low speed, shiftable members on each spindle, driving connections associated with said members and the high speed driven gears which when engaged cause the spindles to be driven by the high speed gears at high speed in said one direction rendering the low speed driving means inoperative.

22. A machine of the class described comprising, a support, a pair of spindles journalled therein for independent rotation, a single drive shaft, a low speed and a high speed drive gear on said drive shaft, a set of driven gears on each spindle each set including a low speed and a high speed gear in mesh with the first-named gears and normally rotatable relative to the spindles with which they are associated, and means for selectively and operatively connecting either one of said driven gears to its respective spindle including clutch members fixed on said spindles, driving means associated with said members and the low speed gears whereby the spindles may be driven in one direction at low speed, independently shiftable members one on each spindle, engageable driving connections associated with said shiftable members and the high speed driven gears which when engaged cause the spindles to be driven by the high speed gears at high speed in said one direction rendering the low speed driving means inoperative, and means to operate said shiftable members independently of one another.

23. A machine of the class described comprising in combination, a support, a pair of hollow spindles journalled therein for independent rotation, a pair of gears consisting of low and high speed driven gears associated with each of said spindles, a single drive shaft, a low speed and a high speed drive gear thereon meshing with the said low and high speed driven gears, recesses in said low speed driven gears, clutch bodies fixed on said spindles, clutch means associated with the bodies and recesses arranged and adapted for operative engagement whereby the bodies and spindles are rotated at one speed in one direction by the low speed driven gears, shiftable members relatively non-rotatable on said spindles, engageable members associated with the high speed driven gears and shiftable members arranged for engagement when the shiftable members are in high speed positions whereby the spindles are driven by the said high speed driven gears at a relatively faster speed to render the clutch means inoperative for driving the spindles.

24. A machine of the class described comprising in combination, a support, a pair of hollow spindles journalled therein for independent rotation, a set of gears consisting of low and high speed driven gears associated with each of said spindles, a single drive shaft, a low speed and a high speed drive gear rotatable thereon meshing with the said low and high speed gears, recesses in said low speed driven gears, clutch bodies and recesses arranged and adapted for engagement whereby the bodies and spindles may be rotated at one speed and in one direction by the low speed driven gears, shiftable members relatively non-rotatable on each of said spindles, engageable members associated with the high speed driven gears and shiftable members arranged for engagement when the shiftable members are in high speed positions whereby the spindles are driven by the said high speed driven gears at a relatively faster speed to render the clutch means inoperative for driving the spindles, and means for shifting the shiftable members including movable yokes one for each spindle acting on the shiftable members and a common means for actuating said yokes.

25. A machine of the class described comprising in combination, a support, a pair of hollow spindles journalled therein for independent rotation, a set of gears for each spindle each including a high and a low speed gear relatively rotatable on their respective spindle, a single drive shaft, a single low speed and a single high speed drive gear thereon meshing with the low and high speed gears, a shiftable member slidable on and operatively engaging each spindle, clutch means associated with each shiftable member and adjacent low speed driven gear which when engaged with the shiftable member in low speed position causes the spindle to be driven at low speed from the low speed drive gear, engageable means associated with the shiftable members and high speed gears which when engaged cause the high speed driven gear to be driven from the single high speed drive gear, the said clutch means and engageable means being arranged whereby either the high or low speed driven gear on each spindle is connected to the drive gears, a driven shaft operatively connected to the drive shaft, shifters mounted for independent movements on said support operatively connected to the shiftable members, and means for actuating said shifters including a member rotatable with the driven shaft alternately engaging the said shifters.

26. A machine of the class described comprising in combination, a support, a pair of hollow spindles journalled therein for independent rotation, a rotatable shaft having a cam drum thereon controlling feeding of bar stock through said spindles, a set of gears for each spindle each including a high and a low speed gear, said low speed gears being relatively rotatable on the respective spindles, a single drive shaft, a single low speed and a single high speed drive gear thereon meshing with the low and high speed gears, a shiftable member slidable on and operatively engaging each spindle, shifters mounted for independent movements on said support and operatively connected to the shiftable members, and means for actuating the shifters, the said means including a member rotatable with the drum shaft and members movable on the shifters into and out of the path of movement of said member adapted to be operatively engaged by said member only when the drum shaft rotates in one direction.

27. In a machine of the class described, separate rotatable spindles, engageable clutch members, independently shiftable clutch operating members, a rotatable drum shaft, an actuator thereon, members on the operating members shiftable into and out of the path of movement of the actuator adapted and arranged to be moved out of said path by the actuator as it rotates in one direction and engaged thereby when the actuator operates in another direction.

28. In a machine of the character described, a rotatable spindle, a two speed power transmitting mechanism for driving said spindle and including a low speed train and a high speed train, the driven element of each train being carried on said spindle, and means for selectively connecting either of said trains with said spindle comprising an overrunning clutch associated with said low speed train and a drive clutch slidable on said spindle between the driven elements of each train, normally in condition to drive said spindle through said high speed train and adapted upon actuation to disable said high speed train whereby said spindle is driven through the low speed train.

29. In a machine of the character described, a work spindle rotatable on a fixed axis, a low speed gear and a high speed gear operatively carried on said spindle and spaced axially from each other, said low speed gear including an overrunning clutch, a clutch collar slidably carried on said spindle between said high and low speed gears to rotate with said spindle, and means for yieldably holding said collar normally clutched with said high speed gear, said collar being slidable on said spindle against the power of said yieldable holding means to release said high speed gear from said spindle.

30. In a machine of the character described, a spindle rotatable on a fixed axis, a low speed gear and a high speed gear operatively carried on said spindle and spaced axially from each other, said low speed gear including an overrunning clutch having a body portion fixed to said spindle, a clutch collar slidably carried on said body portion to rotate therewith and normally clutched with said high speed gear, and a spring backed by said body portion and acting upon said clutch collar to yieldably hold same in engagement with said high speed gear.

31. In a machine of the character described, a spindle rotatable on a fixed axis, a low speed gear and a high speed gear operatively carried on said spindle and spaced axially from each other, said low speed gear including an overrunning clutch having a body portion fixed to said spindle and a flange disposed to rotate within said low speed gear and having apertures therein, a clutch collar slidably carried on said body portion to rotate therewith and normally clutched with said high speed gear, and springs within said flange apertures acting upon said clutch collar to yieldably hold same in engagement with said high speed gear.

32. In a machine of the character described, a pair of work spindles rotatable on fixed axes, a tool slide movable transversely to the axes of said spindles having tools thereon in position to act on the work held in said spindles, a second tool slide movable longitudinally of the axes of said spindles having tools thereon movable into engagement with the work held by said spindles, operating mechanism for operating said tool slides, drive means for rotating said spindles normally at a high speed including a drive shaft having a high speed gear and high speed gears on said spindles driven thereby, drive means for rotating said spindles at a lower speed during engagement of certain of the tools on said movable slides including a low speed gear on said drive shaft and low speed gears on said spindles driven thereby, and clutch means for selectively connecting said high and low speed drives.

33. In a machine of the character described, a series of rotatable work spindles, means for driving said spindles at either high or low speed, a rotatable turret supporting tools of different character, means for indexing said turret to present different tools for operation on the work in each of the respective spindles, and automatic means for selectively connecting the high and low speed spindle driving means to said spindles having an operative connection with said indexing means.

34. In a machine of the character described, a pair of work spindles rotatable on fixed axes, a drive shaft, driving connections for driving said spindles at either high or low speed including high and low speed driving gears on said shaft and high and low speed gears on said spindles driven thereby, overrunning clutch means in said low speed connection enabling said spindles to be driven at high speed by said high speed connection, and clutch means in said high speed connection for establishing and interrupting said high speed drive.

35. In a machine of the character described, a plurality of work spindles rotatable on fixed axes, a drive shaft, driving connections for driving said spindles at either high or low speed including high and low speed driving gears on said shaft and high and low speed gears on said spindles driven thereby, overrunning clutch means in said low speed connection enabling said spindles to be driven at high speed by said high speed connection, clutch means in said high speed connection for establishing and interrupting said high speed drive, tool feeding mechanism for advancing high and low speed cutting tools into engagement with the work in said spindles, and means for automatically controlling said clutch means to establish said high speed drive when said high speed cutting tools are operating on the work in said spindles and interrupting the same when said low speed cutting tools are operating thereon.

36. In a machine of the character described, a pair of work spindles rotatable on fixed parallel axes, a drive shaft between said spindles, driving connections for driving said spindles from said shaft at either high or low speed including a high and a low speed pinion on said shaft and a high and a low speed driven gear on each spindle, overrunning clutch means in said low speed driving connection enabling said spindles to be driven at high speed by said high speed pinion, and clutch means in said high speed connection for establishing and interrupting said high speed drive.

37. In a machine of the character described, a pair of work spindles rotatable on fixed parallel axes, a tool slide movable transversely to the axes of said spindles having tools operating simultaneously on the work held in said spindles, a second tool slide movable longitudinally of said spindles having tools thereon movable into engagement with the work held in said spindles, operating mechanism for operating said tool slides, a drive shaft, high and low speed driving gears on said shaft and high and low speed driven gears on said spindles driven thereby, and means controlling said connections for enabling said spindles to be driven at high speed when said transversely movable tools are in engagement with the work in said spindles and at low speed when said longitudinally movable tools are in engagement therewith.

ELMER E. KELLEY.

CERTIFICATE OF CORRECTION.

Patent No. 2,270,310.  January 20, 1942.

ELMER E. KELLEY.

It is hereby certified that error appears in the printed specification of the above numbered patent requiring correction as follows: Page 3, first column, line 40, after "endwise" insert --movement--; page 5, second column, lines 6 and 7, claim 2, strike out ", said means having an operative connection with said tool indexing means"; page 6, second column, line 45, claim 15, for "spindles" read --spindle--; and that the said Letters Patent should be read with this correction therein that the same may conform to the record of the case in the Patent Office.

Signed and sealed this 31st day of March, A. D. 1942.

(Seal)

Henry Van Arsdale,
Acting Commissioner of Patents.